Figure 1:
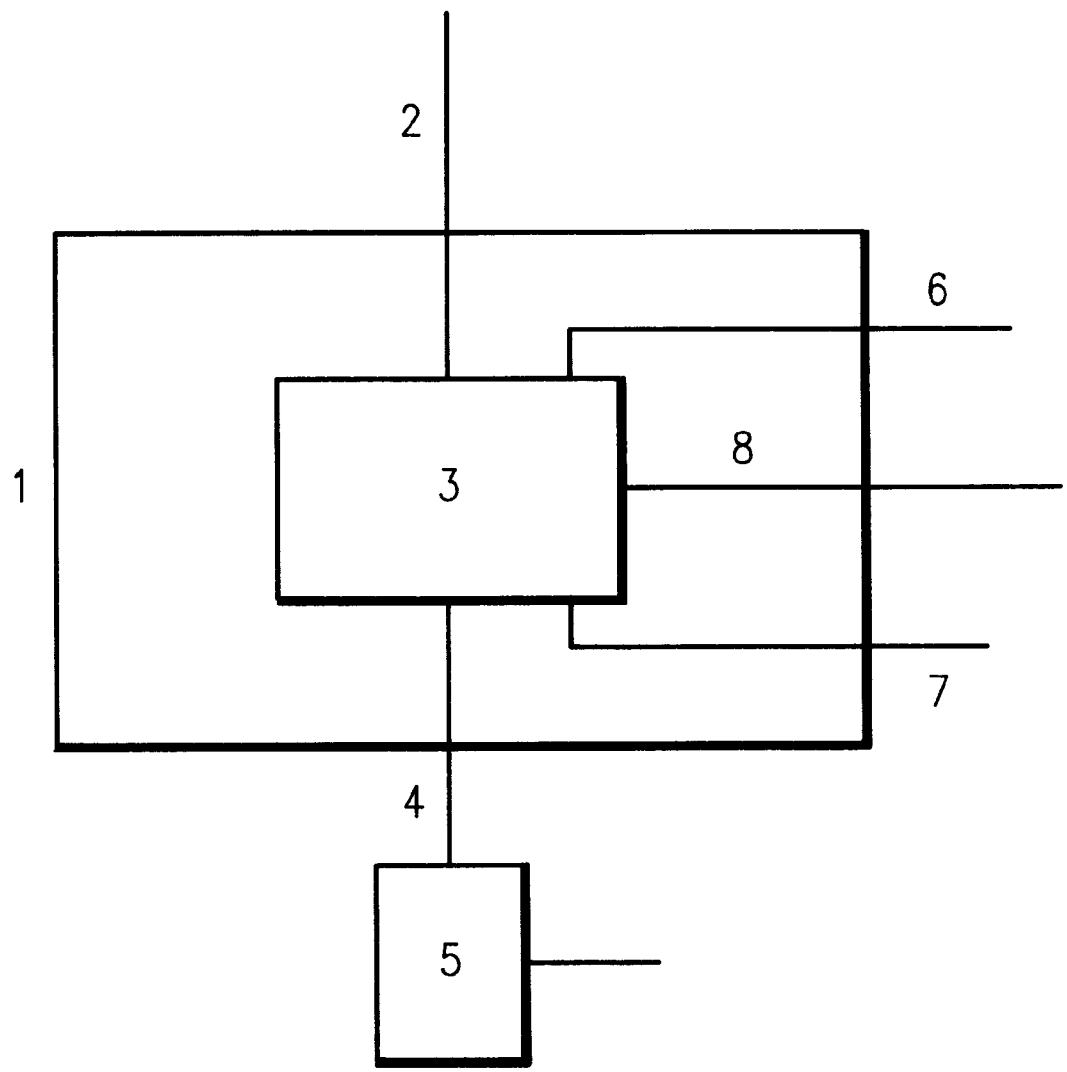

United States Patent [19]

Bratton et al.

[11] Patent Number: 6,001,257
[45] Date of Patent: Dec. 14, 1999

[54] LIQUID SEPARATION BY ZEOLITE MEMBRANES

[76] Inventors: Graham J Bratton, 154 Old Farm Avenue, Sidcup Kent, United Kingdom, DA15 8AL; Karon D Buck, Alancroft Kingsfield Road, Sidcup Kent, United Kingdom, TN15 6LH; Timothy De Villiers Naylor, Englefield Green, Englefield Green Sy, United Kingdom, TW2 0NQ

[21] Appl. No.: 08/836,937
[22] PCT Filed: Nov. 22, 1995
[86] PCT No.: PCT/GB95/02721
§ 371 Date: May 22, 1997
§ 102(e) Date: May 22, 1997
[87] PCT Pub. No.: WO96/16727
PCT Pub. Date: Jun. 6, 1996

[30] Foreign Application Priority Data

Nov. 25, 1994 [GB] United Kingdom .................... 9423805

[51] Int. Cl.⁶ .................................................. B01D 61/00
[52] U.S. Cl. .................. 210/650; 210/321.75; 210/231; 210/640; 210/490
[58] Field of Search ................................ 210/500.25, 640, 210/416.1, 321.75, 490, 650, 231; 96/6; 95/43

[56] References Cited

U.S. PATENT DOCUMENTS

| | | | |
|---|---|---|---|
| 5,595,662 | 1/1997 | Sanderson | 210/500.25 |
| 5,651,888 | 7/1997 | Shimizu et al. | 210/321.75 |
| 5,744,035 | 4/1998 | Geus et al. | 210/500.25 |
| 5,772,735 | 6/1998 | Sehgac et al. | 210/500.25 |
| 5,779,904 | 7/1998 | Ruderman et al. | 210/500.25 |

FOREIGN PATENT DOCUMENTS

| | | |
|---|---|---|
| 461607 | 6/1991 | European Pat. Off. . |
| 476363 | 3/1992 | European Pat. Off. . |
| 481660 | 4/1992 | European Pat. Off. . |
| 659469 | 6/1995 | European Pat. Off. . |

*Primary Examiner*—Ana Fortuna
*Attorney, Agent, or Firm*—Bartlett & Sherer; Ronald B. Sherer

[57] ABSTRACT

Apparatus for removing water from water containing liquids in which a chamber with walls formed from a zeolite membrane can be immersed in the liquid mixture so that water passes into the interior of the chamber where it can be removed.

11 Claims, 4 Drawing Sheets

LIQUID SEPARATION BY ZEOLITE MEMBRANES

The present invention relates to an apparatus and a method for the removal of water from liquids, such as organic liquids, biological fluids, foodstuffs, pharmaceutical preparations etc. more particularly it relates to a non-distillation method of removing water from liquids in order to obtain a substantially dry liquid.

In chemical operations it is sometimes necessary to have substantially dry liquids e.g. as solvents, reagents etc. For some liquids it is very difficult to obtain them in a substantially dry state as, for example azeotropic mixtures are formed on distillation and the removal of residual amounts of water can involve difficult and expensive processes such as re-distillation with another organic liquid. These processes can involve the use of harmful chemicals such as benzene and cyclohexane. Other liquids would be degraded thermally by the temperatures require for effective removal of water.

A particular requirement is for the supply of substantially dry liquids for small scale or laboratory use where the liquids need to be stored for a period and the cost of these liquids can be very high.

In the laboratory organic solvents can be left some while before being used and are prone to absorb water from the atmosphere unless strenuous precautions are taken to prevent this.

We have now devised an apparatus and a process which can dehydrate liquids in situ on a small scale without the need for distillation particularly with thermally sensitive compounds.

According to the invention there is provided apparatus for the removal of water from a water-containing liquid, which apparatus comprises a receptacle for the water-containing liquid, a membrane zeolite membrane which can contact the water-containing liquid in the receptacle and a water removal means for removing water separated by the zeolite membrane.

The invention also comprises a chamber at least part of the walls of which comprise a zeolite membrane which has an outlet from which water can be removed. In use the chamber is immersed in the liquid containing water so that only the water can pass into the chamber and thus be separated from the liquid.

There can be a plurality of chambers interconnected to give a larger surface area of zeolite. The chambers can be connected by means of a tube or the like, which leads out of the liquid into which the chamber is immersed.

The zeolite membrane includes zeolitic membranes and membranes made from zeo-type materials.

Zeolitic membranes and membranes which incorporate zeolites are also well known and can come in a range of different types. European Patent Application 0481660 discloses and discusses prior art zeo-type membranes and refers in particular to U.S. Pat. Nos. 3,244,643, 3,730,910 and 4,578,372, Applied Catalysts 49(1989) 1–25, DE-A-3827049, CA1235684, JP-A-63287504, JP-A-63291809, EP-A-180200, EP-A-135069.

Zeo-type materials are also known as molecular sieves which are widely known and used. They comprise an extended network of channels formed from silicon/oxygen tetrahedrons joined through the oxygen atoms. Zeolites and alumino-silicates are the most commonly known form of zeo-type materials and the present invention is applicable to any membrane formed from zeo-type materials and particularly applicable to zeolites and alumino-silicates. In the "Atlas of Zeolite Structure Types", Meier and Ofsen, 1987, Polycrystal Book Service, Pittsburg USA, various types of structure are described and, for example, those described as having LTA, MEL, MFI or TON structure can be used.

In "New Developments in Zeolite Science and Technology Proceedings of the 7th International Conference, Tokyo, 1986, page 103, another class of zeo-type materials are disclosed as crystalline aluminophosphate, silicoalumina phosphates and other metallo-alumino phosphates.

The zeolite membranes are preferably in the form of zeolite crystals grown or deposited on a porous support.

The porous supports on which zeo-type membranes are formed and which can be used in the present invention include those formed of metals, ceramics, glass, mineral, carbon or polymer fibres or cellulosic or organic or inorganic polymers. Suitable metals include titanium, chromium and alloys such as those sold under the Trade Marks "Fecralloy" and "Hastalloy" and stainless steels. The porous supports are preferably formed of a mesh or from sintered metal particles or a mixture of both. These are commonly sold in the form of filters.

Porous ceramics, glass mineral or carbon materials can also be used including porous silicon and other carbides, clays and other silicates and porous silica.

If desired, the support can be a zeolite formed by compression or using a binder. The shape of the support is not critical, for example, flat sheet, tubular, wound spiral, etc. can be used. If polymeric materials are used, these can optionally be film coated with metal or metal oxide or a silicic acid as herein defined. The porous support can be also be a granular solid e.g. formed of particles of a closely packed material such as a pellitised catalyst.

The present invention can be used with porous supports of any suitable size although, for large flux rates through a membrane, large pore sizes are preferred. Preferably pore sizes of 0.01 to 2,000 microns, more preferably of 0.1 to 200 and ideally of 1 to 20 microns are used. Pore sizes up to 300 microns can be determined by bubble point pressure as specified in ISO 4003. Larger pore sizes can be measured by microscopic methods.

The zeolite membranes which can be used in the present invention are those with a pore size which will effectively trap the molecules of the appropriate size and zeolite membranes of pore size of 3 to 15 Angstroms, and more preferably of 3 to 5 Angstroms can be used in many cases.

The zeolite membranes should be substantially free of defects so as to provide an effective separation and zeolite membranes as described in our co-pending application PCT/GB95/02221 can be used.

In one embodiment of the invention the chamber can be formed from at least two substantially flat spaced apart zeolite membranes joined at their perimeters and the hollow tube passes through and is connected to the inside of the chamber.

In a particular embodiment of the invention membranes are mounted in pairs so as to define a closed space between, and bounded by the pair of membranes. The interior of this space is connected to the inside of a hollow tube on which the membranes are mounted, so that fluid passing through the membrane can be led away through the hollow tube. For example each membrane in a pair can be in the form of a plate or the like e.g. in the form of discs, which are spaced apart from the each other with their outside edges connected and sealed together. The hollow tube passes through the membranes and, where it passes through each of the membranes, it is sealed against the membrane. Thus the interior of the tube is connected to the space between the membranes in the membrane pair so as to provide an enclosed space bounded by the membranes and the interior of the tube.

The capacity of the apparatus is determined mainly by the capacity of the membrane and a series of membranes can be placed in parallel to obtain a larger capacity and throughput.

In another embodiment of the invention the membranes are tubular membranes and one or more tubular membranes can be positioned so that when they are placed in a liquid in a receptacle, water can pass through the membrane where it can be removed leaving the liquid with a reduced water content in the receptacle In use, the water-containing liquid enters the apparatus through an inlet, passes over the zeolite membrane where water is separated from the liquid and the water is removed via the water removing means and the liquid from which the water has been removed passes out through the liquid outlet. The invention also comprises a method for the removal of water from water-containing liquid which method comprises passing the water-containing liquid over a zeolite membrane in the apparatus of the invention and removing the water removed from the water-containing liquid and recovering the liquid from which the water has been removed.

The invention has advantages in removing water from liquids where it is not possible or practical to remove water by means of distillation or other conventional means, for example by reverse osmosis. The invention can be used for the removal of small amounts of water in situations where other methods have great difficulty in removing the water.

Preferably the water separated is removed by reducing the pressure at the water removing means to draw off the separated water from the membrane and causing more water to enter into the membrane from the water-containing liquid and thus having a continuous or semi continuous system.

If necessary the liquid from the outlet can be passed through the apparatus again to obtain a further dehydration or more than one apparatus can be placed in series to obtain a sequential dehydration.

In laboratory or small scale use preferably there is a means such as a pump for pumping the water-containing liquid through the apparatus and some means of reducing the pressure at the water removing means. In one embodiment a motor which operates a pump at the water-containing liquid inlet and a suction pump as the water removing means is provided so that in operation the water-containing liquid feed is attached to the inlet the motor turned on and the water removed to obtain at the outlet a liquid with a lower water content.

If desired the motor need not be provided and the pump and suction means can be operated by any external power source e.g. from a water supply in the same way as a laboratory vacuum pump.

Advantageously the liquid is stirred e.g. by means of a stirrer such as a magnetic stirrer.

In order to facilitate the effectiveness of the method of the present invention the various liquid streams to and from the apparatus can be heated or cooled as appropriate depending on whether the process of removing the water is exothermic or endothermic and whether vapours are formed or are present. Optionally heat-exchangers can be provided to facilitate this heating or cooling process.

In some applications the water passes through the membrane in the form of water vapour and, as the absorption of the latent heat of evaporation of the water is an endothermic process, there is preferably a heating means to maintain the temperature of the liquids.

It is a feature of the invention that it does not require large amounts of energy and/or a very high vacuum to remove the water, as is the case in distillation and vacuum distillation, or high pressures as in the case of reverse osmosis, but it can be used to supply small amounts of dehydrated liquids "on demand" so as to prevent contamination arising from the storage of dehydrated liquids. Thus by the use of the apparatus and method of the invention it is possible to purchase organic liquids of commercial quality, which can incorporate small amounts of water and, as required, produce substantially dry liquids from these, or to recycle solvents.

Although the apparatus has been described with reference to the separation of water from water containing liquids it can be used to separate any two liquids where only one liquid can pass through the zeolite membrane.

The invention is illustrated in the accompanying drawings in which

Figure 2:
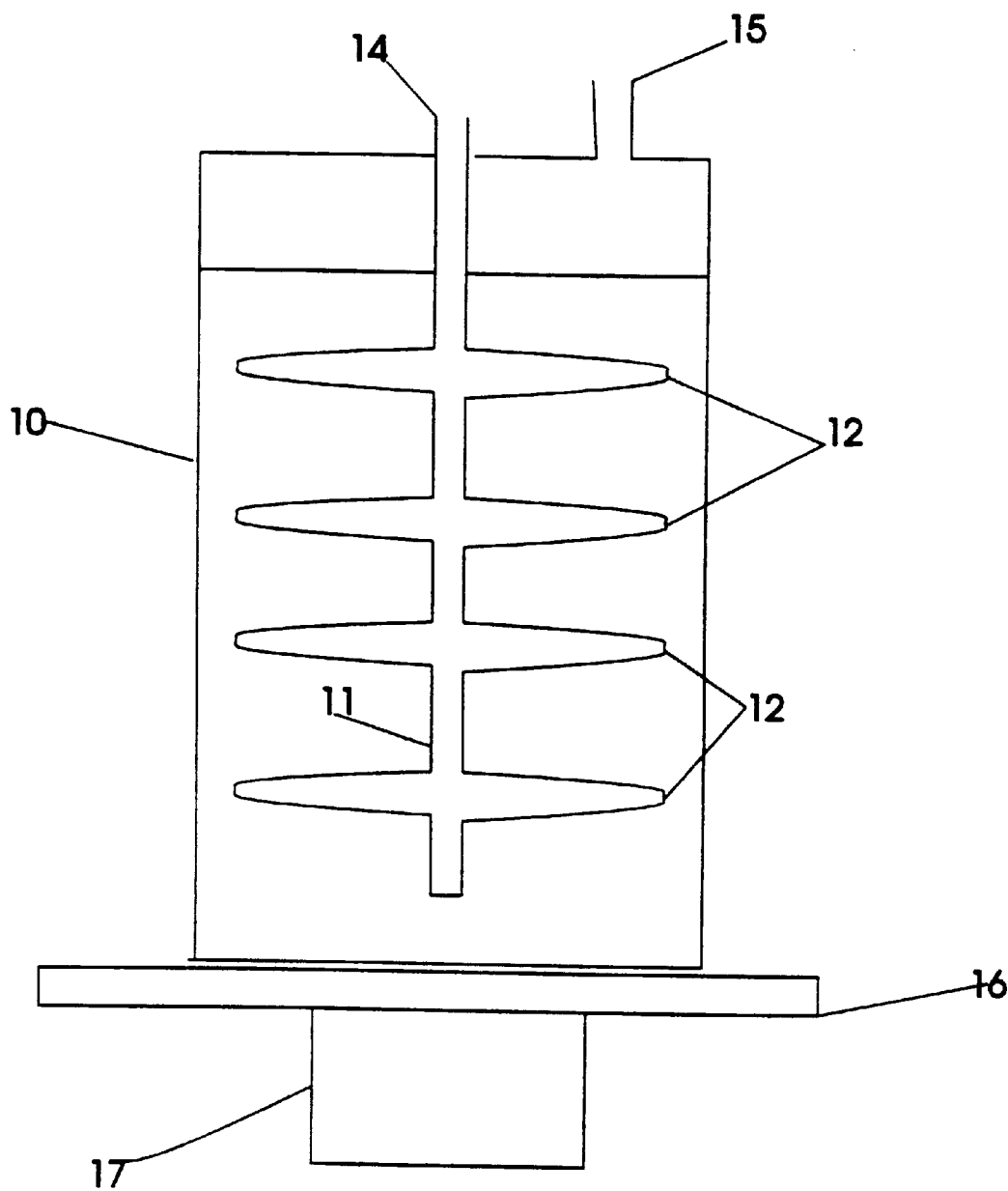
Figure 3:
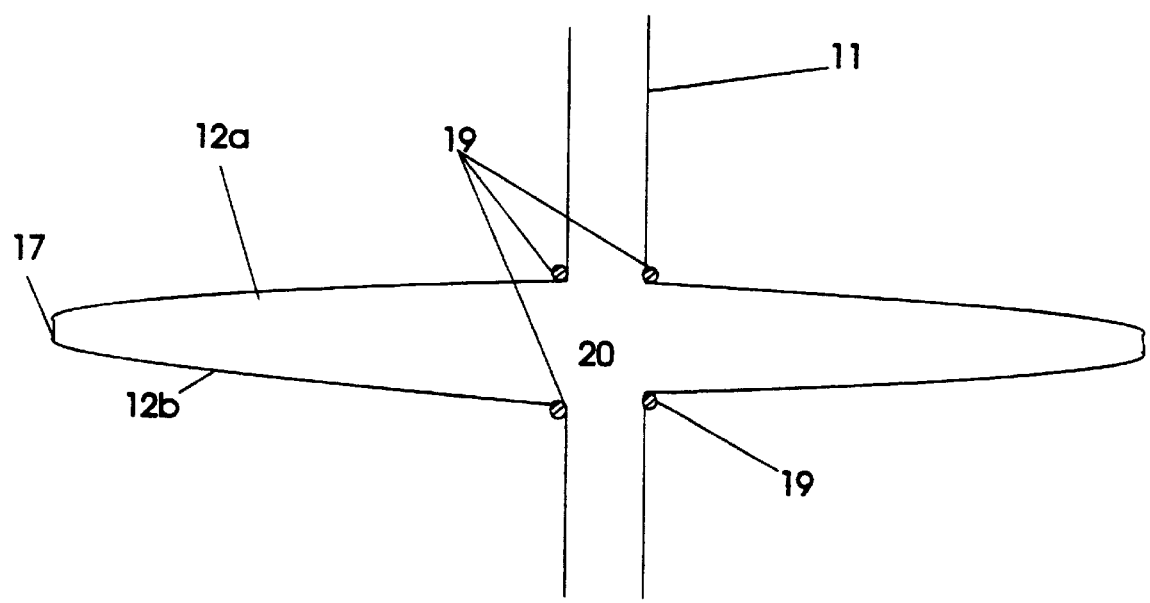
Figure 4:
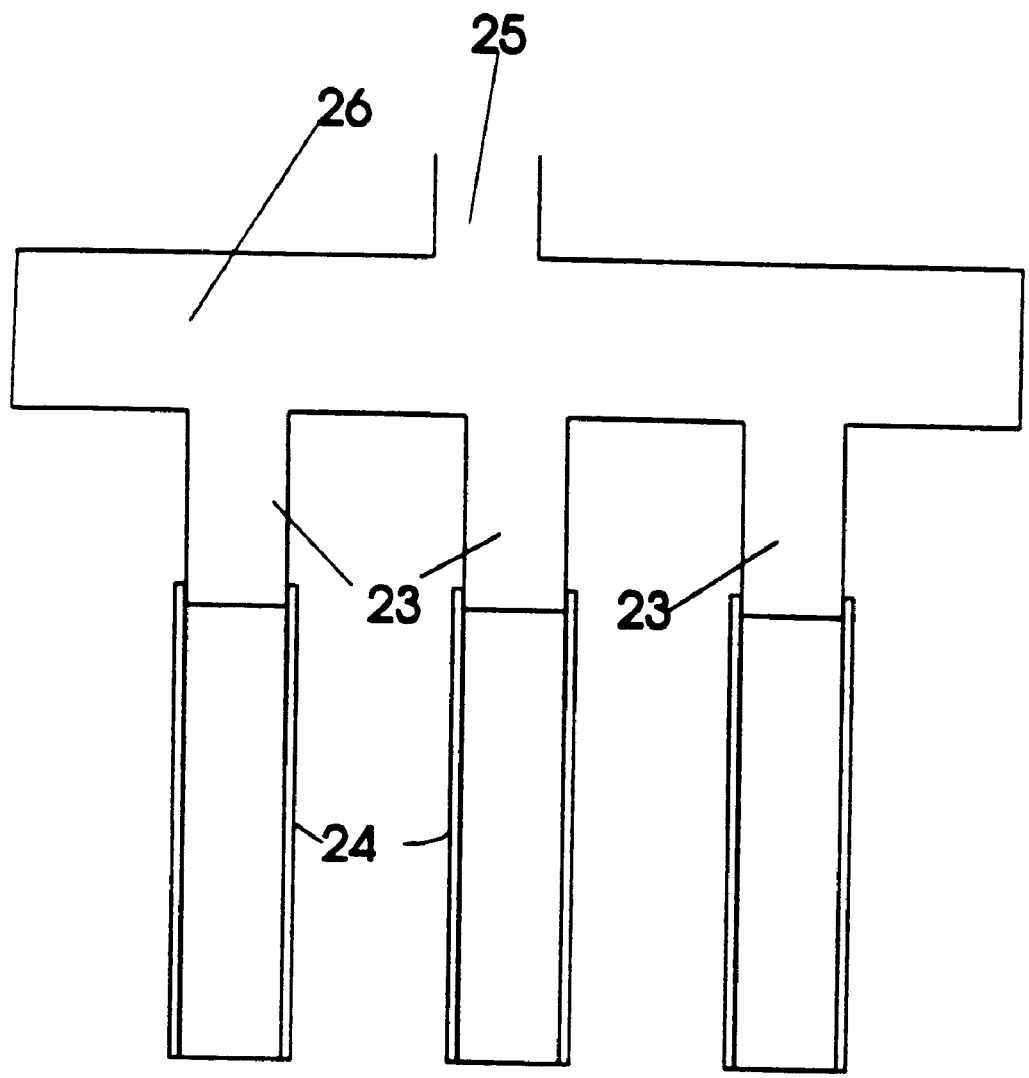

FIG. 1 is a diagrammatic representation of an apparatus according to the invention FIG. 2 is an illustration of the apparatus of the invention and FIG. 3 is an enlarged view of a membrane of FIG. 2 and FIG. 4 is an alternative arrangement of the membrane.

Referring to FIG. 1 a container (1) has an inlet for water-containing liquid (2) which leads to a membrane containing receptacle (3) which contains a zeolite membrane. From (3) there is an outlet (4) which takes the treated liquid stream to a conditioning container (5) and thence to use.

Water removing means (8) leads water separated by the zeolite membrane to an outlet. Pipes (6) and (7) act as a heat exchanger and are capable of passing heating or cooling liquid around the (3) to maintain it at the correct temperature.

In use the water-containing liquid is passed through (2) to (3) by means of the application of an external pressure e.g. by a pump. Low pressure is applied at (8) to remove water separated by the zeolite membrane. The treated liquid from (3) can be passed through conditioning chamber (5) if needed e.g. to adjust the temperature of the liquid so it is suitable for its immediate purpose or for any other purpose.

If needed to heat or cool (3), heating or cooling liquid can be passed through pipes (6) and (7) as appropriate.

Referring to FIG. 2, a receptacle (10) contains the liquid from which water is to be removed. A hollow tube (11) has zeolite membrane chambers (12), shown in more detail in FIG. 3, attached to it. There are means attached to tube outlet (14) to remove water and water vapour from the tube (11). There is a nitrogen feed (15) which generates a blanket of nitrogen under pressure over the liquid surface. There is a heater (16) which can maintain the liquid at the desired temperature and a magnetic stirrer (17) which can stir the liquid in the receptacle (10). There are means (not shown) to add and remove liquid from the receptacle.

Referring to FIG. 3 the zeolite chamber (12) is a structure formed from two wire mesh supports (12a) and (12b) on which are deposited or crystalised zeolite membranes The ends (17) of each of the membranes are joined together to form a substantially air tight seal. Where the tube (11) passes through the membrane it is joined to the membrane to form a substantially air tight seal at (19).

In use the liquid containing the water is placed in receptacle (10) and the vessel sealed. Nitrogen under pressure enters through feed (15) and a vacuum is applied at (14). The heater (16) is turned on and stirrer (17) operated.

Water passes through the membrane into chamber (12) and into tube (11) where it can be removed; the liquid in the receptacle then has a lowered water content. When the water content has been reduced to the required level the liquid can then be removed.

Referring to FIG. 3 tubes (23) are made of metal mesh and have a lower portion (24) on which is deposited a zeolite membrane, the tubes are connected to a manifold (26) and a vacuum is applied at (25). Water is drawn through membranes (24) into the tubes, from where it can be removed via (25).

The equipment thus enables liquid to be at least partially dehydrated as required in an easy and convenient manner.

What is claimed is:

1. An apparatus for removing water from a water containing liquid in which the water containing liquid is contacted with a zeolite membrane and water passes through the membrane, which apparatus comprises a receptacle for the water containing liquid, in which receptacle is placed a plurality of interconnected chambers each of which chamber comprises two spaced apart zeolite membranes, joined at their edges to form the chamber, the interior of each chamber only being accessible to liquid in the said receptacle by liquid passing through the zeolite membrane, each chamber being mounted around an interconnecting hollow tube passing through the chambers and each chamber having a linear dimensions substantially greater than the distance apart of the spaced apart zeolite membrane forming the chamber, so as to form a structure comprising a plurality of substantially parallel chambers mounted around the interconnecting tube whereby when the chambers are placed in a water containing liquid in the said receptacle water is passed through the said membrane into the chamber and is able to be removed through said interconnecting hollow tube.

2. Apparatus as claimed in claim 1 in which there are means attached to the said outlet to remove water and water vapor through the said interconnecting hollow tube and there is a nitrogen feed adapted to generate a blanket of nitrogen under pressure over the surface of a liquid in the receptacle.

3. Apparatus as claimed in claim 2 in which the zeolite membrane is formed by the deposition of zeolite crystals on to a wire mesh.

4. Apparatus as claimed in claim 3 in which the zeolite membrane has a pore size of 3 to 15 Angstroms.

5. Apparatus as claimed in claim 4 in which the zeolite membrane has a pore size of 3 to 5 Angstroms.

6. Apparatus as claimed in claim 1 in which the zeolite membrane has a pore size of 3 to 15 Angstroms.

7. Apparatus as claimed in claim 2 in which the zeolite membrane has a pore size of 3 to 15 Angstroms.

8. Apparatus as claimed in claim 1 in which the zeolite membrane is formed by the deposition of zeolite crystals on to a wire mesh.

9. Apparatus as claimed in claim 8 in which the zeolite membrane has a pore size of 3 to 15 Angstroms.

10. Apparatus as claimed in claim 9 in which the zeolite membrane has a pore size of 3 to 5 Angstroms.

11. A method of separating water from a water containing liquid by using an apparatus which comprises a receptacle for the water containing liquid and a plurality of interconnected chambers each chamber comprising two spaced apart zeolite membranes joined at their edges and being mounted around an interconnecting hollow tube, and wherein the method comprises immersing the interconnected chambers in the water containing liquid so that only the water from the water containing liquid passes through the zeolite membrane into the interior of the chambers and the seperated water is removed from the chambers through the interconnecting hollow tube.

* * * * *